US012692407B2

(12) United States Patent  
Imada et al.

(10) Patent No.: US 12,692,407 B2  
(45) Date of Patent: Jul. 28, 2026

(54) POWDER COATING MATERIAL COMPOSITION

(71) Applicant: DAIKIN INDUSTRIES, LTD., Osaka (JP)

(72) Inventors: Hirotake Imada, Osaka (JP); Toshio Miyatani, Osaka (JP); Yukari Honda, Osaka (JP); Yasukazu Nakatani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 18 days.

(21) Appl. No.: 18/409,155

(22) Filed: Jan. 10, 2024

(65) Prior Publication Data

US 2024/0141195 A1      May 2, 2024

Related U.S. Application Data

(63) Continuation of application No. PCT/JP2022/028296, filed on Jul. 21, 2022.

(30) Foreign Application Priority Data

Jul. 21, 2021      (JP) ................................. 2021-120332

(51) Int. Cl.
| | |
|---|---|
| *C09D 127/18* | (2006.01) |
| *B05D 1/04* | (2006.01) |
| *C09D 7/48* | (2018.01) |

(52) U.S. Cl.  
CPC ............. *C09D 127/18* (2013.01); *B05D 1/04* (2013.01); *C09D 7/48* (2018.01)

(58) Field of Classification Search  
CPC ........... C09D 127/18; C09D 7/48; B05D 1/04  
See application file for complete search history.

(56) References Cited

U.S. PATENT DOCUMENTS

| | | | |
|---|---|---|---|
| 6,372,870 B1 | 4/2002 | Kitahara et al. | |
| 6,673,454 B1 | 1/2004 | Tsuda et al. | |
| 2004/0204536 A1 | 10/2004 | Miyatani et al. | |
| 2004/0254300 A1 | 12/2004 | Namimatsu et al. | |
| 2010/0212929 A1 | 8/2010 | Ishii et al. | |
| 2017/0152395 A1 | 6/2017 | Fukumura et al. | |

FOREIGN PATENT DOCUMENTS

| | | | |
|---|---|---|---|
| EP | 1 262 496 A1 | 12/2002 | |
| JP | 2000-26767 A | 1/2000 | |
| JP | 2003003111 A | 1/2003 | |
| JP | 2006111885 A | 4/2006 | |
| JP | 2011202033 A | 10/2011 | |
| JP | 2016169339 A | 9/2016 | |
| WO | 01/36504 A1 | 5/2001 | |
| WO | 03/006566 A1 | 1/2003 | |
| WO | 03022922 A1 | 3/2003 | |
| WO | 2008047759 A1 | 4/2008 | |

OTHER PUBLICATIONS

International Preliminary Report on Patentability (with translation of Written Opinion) dated Jan. 18, 2024, issued in International Application No. PCT/JP2022/028296.  
International Search Report for PCT/JP2022/028296 dated Oct. 4, 2022.

*Primary Examiner* — Catherine S Branch  
*Assistant Examiner* — Andrea Wu  
(74) *Attorney, Agent, or Firm* — Sughrue Mion, PLLC

(57)      ABSTRACT

A powder coating material composition including a tetrafluoroethylene-based copolymer, wherein the tetrafluoroethylene-based copolymer is a copolymer of 9.0 to 13.0 mass % of hexafluoropropylene, 0.8 to 3.0 mass % of a perfluoroalkyl vinyl ether, and tetrafluoroethylene, having a melt flow rate of 13 to 26 g/10-min, a melting point of 240 to 270° C., an average particle size of 5 to 500 μm and an apparent density of 0.5 to 1.1 g/ml. Also disclosed is a film that is formed from the powder coating material composition, a laminate including the film, a coated article wherein the film of the powder coating material composition is provided on a metal substrate, and a film-forming method which includes forming a primer film on an object to be coated, and forming a film on a surface of the primer film using the powder coating material composition.

10 Claims, No Drawings

POWDER COATING MATERIAL COMPOSITION

CROSS REFERENCE TO RELATED APPLICATIONS

This application is a Rule 53(b) Continuation of International Application No. PCT/JP2022/028296 filed Jul. 21, 2022, which claims priority from Japanese patent application No. 2021-120332 filed Jul. 21, 2021, the respective disclosures of all of which are incorporated herein by reference in their entireties.

TECHNICAL FIELD

The present disclosure relates to a powder coating material composition.

BACKGROUND ART

Piping materials such as tubes, pipes, and valves are desirably subjected to a corrosion-resistant lining in order to have resistance against chemicals and the like when contacting with the chemicals and the like in use. As a material for the corrosion-resistant lining, a fluororesin is preferably used since having excellent resistance against the chemicals such as acids, alkalis, oxidating or reducing agents, and solvents.

The fluororesin has non-stickiness in addition to the corrosion resistance, and thereby also contributes to imparting an antifouling property in terms of chemical prevention of adhering a fouling substance to a surface of the corrosion-resistant lining.

A material for the corrosion-resistant lining having a higher antifouling property has been required in recent years particularly in piping materials and the like of semiconductor manufacturing equipment. Examples of a method for improving the antifouling power of the corrosion-resistant lining using the fluororesin include a method of improving surface smoothness on the corrosion-resistant lining to physically inhibit adhesion of the fouling substance.

The fluororesin is preferably used as a powder coating material because the fluororesin at an amount sufficient for exhibiting the corrosion resistance can be used according to various shapes of an object to be lined as the material for the corrosion-resistant lining, and because of easy handling and the like.

Patent Literature 1 discloses a powder coating material containing a tetrafluoroethylene-based copolymer composed of hexafluoropropylene, perfluoro(vinyl ether), and tetrafluoroethylene, as a powder coating material particularly suitable for coating by a loto-lining method.

CITATION LIST

Patent Literature

Patent Literature 1: International Publication No. 2003/006566

SUMMARY

Solution to Problem

The present disclosure is a powder coating material composition comprising a tetrafluoroethylene-based copolymer, wherein the tetrafluoroethylene-based copolymer is a copolymer of 9.0 to 13.0 mass % of hexafluoropropylene, 0.8 to 3.0 mass % of a perfluoroalkyl vinyl ether, and tetrafluoroethylene, having a melt flow rate of 13 to 26 g/10-min and a melting point of 240 to 270° C.

DESCRIPTION OF EMBODIMENTS

Hereinafter, the present disclosure will be described in detail.

A powder coating material composition of the present disclosure is a powder coating material composition comprising a tetrafluoroethylene-based copolymer, wherein the tetrafluoroethylene-based copolymer is a copolymer of 9.0 to 13.0 mass % of hexafluoropropylene, 0.8 to 3.0 mass % of a perfluoroalkyl vinyl ether, and tetrafluoroethylene, and wherein the powder coating material composition has a melt flow rate of 13 to 26 g/10-min and a melting point of 240 to 270° C.

The powder coating material composition of the present disclosure is used by coating on an object to be coated and then heating and baking to form a film. The film obtained by coating as above can be used in various use as a corrosion-resistant lining.

To obtain good surface smoothness on a film formed by coating an object to be coated with a powder coating material composition, it has been investigated to regulate a melt flow rate (MFR) of a TFE-based copolymer depending on a number of coating times.

The powder coating material composition of the present disclosure can form the film having good surface smoothness regardless of a number of coating times by using the tetrafluoroethylene-based copolymer having the specific formulation ratio, MFR, and melting point.

The powder coating material composition of the present disclosure can be used for: thin coating with a film thickness after baking of 50 to 200 μm or thick coating with a film thickness after baking of more than 200 μm and 5,000 μm or less, by using a coating method such as electrostatic coating and loto-lining depending on the use for example.

The powder coating material composition of the present disclosure is particularly preferable for a coating method by electrostatic coating in which coating is typically performed a plurality of times.

In the present disclosure, a step of coating an object to be coated with the powder coating material composition of the present disclosure and then heating and baking the object to form a film is specified as once coating to count the number of coating times.

The film thickness after baking refers to a thickness obtained when the number of coating times is one or a thickness obtained when the number of coating times is two or more by repeating the above steps two or more times. The case where the number of coating times is two or more may be referred to as "repeat-coating" herein.

The powder coating material composition of the present disclosure contains the tetrafluoroethylene (hereinafter, referred to as "TFE")-based copolymer.

The TFE-based copolymer herein means a copolymer having TFE as a main component in a copolymerization formulation. The copolymerization formulation herein means types of monomer units, which are basic units of a chemical structure of the TFE-based copolymer, and amounts (mass %) of the monomer units of the types in the TFE-based copolymer.

The TFE-based copolymer contained in the powder coating material composition of the present disclosure is a copolymer of 9.0 to 13.0 mass % of hexafluoropropylene (hereinafter, referred to as "HFP"), 0.8 to 3.0 mass % of a perfluoroalkyl vinyl ether (hereinafter, referred to as "PAVE"), and tetrafluoroethylene.

Since having the TFE-based copolymer having the copolymerization formulation as a base resin, the powder coating material composition of the present disclosure can yield a film excellent both of surface smoothness and chemical resistance.

The PAVE is not limited. Examples thereof include one or two or more of perfluoromethyl vinyl ether (PMVE), perfluoroethyl vinyl ether (PEVE), and perfluoropropyl vinyl ether (PPVE), and perfluoropropyl vinyl ether (PPVE) is particularly preferable.

A content of the HFP is 9.0 to 13.0 mass %. If the content of HFP is less than 9.0 mass %, the TFE-based copolymer has an excessively high melting point to increase a degree of crystallinity, which causes insufficient melting during coating to deteriorate the surface smoothness. If the content exceeds 13.0 mass %, the TFE-based copolymer has an excessively low melting point to deteriorate heat resistance of the obtained coating film. Increasing the number of coating times may cause foaming and dripping.

A lower limit of the preferable content of HFP is 10 mass %, and an upper limit of the preferable content is 12 mass %.

A content of the PAVE is 0.8 to 3.0 mass %. If the content of PAVE is less than 0.8 mass %, the chemical resistance of the obtained film is not sufficiently improved. If the content exceeds 3.0 mass %, an effect corresponding to the increase in the content is not obtained, which is unpreferable in an economical point. A lower limit of the preferable content of PAVE is 0.9 mass %, and an upper limit of the preferable content is 2.6 mass %.

The TFE-based copolymer may contain other monomers within a range not impairing the object of the present disclosure.

The TFE-based copolymer is needed to have a melt flow rate (MFR) of 13 to 26 g/10-min. If the MFR is less than 13 g/10-min, flowability during coating decreases to deteriorate the surface smoothness. In addition, heating in a long time is needed to obtain the target smoothness of the film, which may cause a problem of deterioration of the TFE-based copolymer. If the MFR exceeds 26 g/10-min, foaming and dripping occur with a large number of coating times to deteriorate the surface smoothness.

In the present disclosure, regulating the MFR within the above range yields the good surface smoothness of the film with coating with the powder coating material composition a plurality of times even when the film formed from the powder coating material composition is further coated with the powder coating material composition.

A lower limit of the preferable MFR is 15 mass %, and an upper limit of the preferable MFR is 25 mass %.

The MFR indicates flowability of the melted TFE-based copolymer. The present disclosure is excellent in terms of obtaining the good surface smoothness regardless of the number of coating times by regulating the MFR within the above range.

The TFE-based copolymer can have the MFR within the aforementioned range by regulating a molecular weight thereof.

The MFR herein is a value measured in accordance with ASTM D2116 at a temperature of 372° C. with a load of 5 kg.

The TFE-based copolymer has a melting point of 240 to 270° C. A melting point of lower than 240° C. deteriorates heat resistance, and a melting point of higher than 270° C. hardly yields the smooth surface.

The melting point herein is a value measured in accordance with ASTM D2116.

A method for manufacturing the TFE-based copolymer is not limited, and the TFE-based copolymer can be obtained by copolymerization using a conventionally known polymerization method such as emulsion polymerization and suspension polymerization, for example.

The powder coating material composition of the present disclosure preferably has an average particle size of 5 to 500 μm. If the average particle size is less than 5 μm, electrostatic repulsion is likely to occur during coating, and tends to cause difficulty in forming a thick film. If the average particle size exceeds 500 μm, the smoothness and the like of the obtained film may be deteriorated.

The average particle size of the powder coating material composition has a more preferable range decided according to the coating method. When the powder coating material composition is used for electrostatic coating, the average particle size is more preferably 10 to 70 μm. When the powder coating material composition is used for loto-lining, the average particle size is more preferably 150 to 400 μm.

The average particle size of the powder coating material composition has a more preferable range decided according to a thickness of the film to be formed by electrostatic coating as necessary. When the powder coating material composition is used for the aforementioned thin coating, the average particle size is more preferably 10 to 40 μm. When the powder coating material composition is used for the aforementioned thick coating, the average particle size is more preferably 40 to 70 μm.

The average particle size of the powder coating material composition can be within the above range by regulating conditions of crashing or classifying in a method for manufacturing the powder coating material composition of the present disclosure, described later.

The average particle size herein is a value measured by a laser diffraction method. In specific, the average particle size is a median diameter on a volumetric basis measured with MT-3300II, manufactured by MicrotracBEL Corp.

The powder coating material composition of the present disclosure preferably has an apparent density of 0.5 to 1.1 g/ml. If the apparent density is less than 0.5 g/ml, foaming occurs during coating or the number of coating times increases, which may cause difficulty in electrostatic coating. If the apparent density exceeds 1.1 g/ml, it is difficult to industrially manufacture such a powder coating material composition. A lower limit of the preferable apparent density is 0.7 g/ml, and an upper limit of the preferable apparent density is 1.0 g/ml.

The apparent density (g/ml) herein is a value obtained by measurement in accordance with JIS K 6891.

The powder coating material composition of the present disclosure may contain a thermal stabilizer. The powder coating material composition of the present disclosure containing the thermal stabilizer can prevent coloring and foaming of the coating film that can be caused by destabilization of the TFE-based copolymer when heated at higher than or equal to a temperature near the melting point.

The thermal stabilizer is preferably at least any one selected from the group consisting of an amine-type antioxidant, an organic sulfur-containing compound, and a metal powder in terms of prevention of oxidation of the TFE-based copolymer.

Examples of the amine-type antioxidant include aromatic amines having an aromatic hydrocarbon group such as a phenyl group and a naphthyl group in the molecule. Examples thereof include: phenylenediamine-type compounds, such as N,N'-diphenyl-p-phenylenediamine, N,N'-di-2-naphthyl-p-phenylenediamine, and a reaction product of diphenylamine and diisobutylene; and other aromatic secondary amine compounds, such as dinaphthylamine, phenyl-α-naphthylamine, phenyl-β-naphthylamine, 4,4'-bis(α,α'-dimethylbenzyl)diphenylamine, phenylcyclohexy-p-phenylenediamine, and styrenated diphenylamine.

Examples of the organic sulfur-containing compound include: mercaptobenzimidazole-type compounds, such as 2-mercaptobenzimidazole and 2-mercaptomethylbenzimidazole; mercaptobenzothiazole-type compounds, such as 2-mercaptobenzothiazole, a cyclohexylamine salt of 2-mercaptobenzothiazole, dibenzothiazyl disulfide, 2-(4'-morpholinodithio)benzothiazole, N-cyclohexyl-2-benzothiazolylsulfenamide, N-oxydiethylene-2-benzothiazolylsulfenamide, and N-tert-butyl-2-benzothiazolylsulfenamide; mercaptoimidazoline-type compounds, such as 2-mercaptoimidazoline; and dithiocarbamic acids, such as pentamethylenedithiocarbamic acid, pipecolyldithiocarbamic acid, dimethyldithiocarbamic acid, diethyldithiocarbamic acid, dibutyldithiocarbamic acid, and N-ethyl-N-phenyldithiocarbamic acid. These organic sulfur-containing compounds may be: metal salts of Zn, Sn, Cd, Cu, Fe, and the like; and organic salts such as piperidine salts and pipecolyl salts, for example.

Examples of the organic sulfur-containing compound include thiuram-type compounds. Examples thereof include: thiuram monosulfides, such as tetramethylthiuram monosulfide; thiuram disulfides, such as tetramethylthiuram disulfide, tetraethylthiuram disulfide, and tetrabutylthiuram disulfide; and other thiuram-type compounds such as dipentamethylenethiuram tetrasulfide.

The organic sulfur-containing compound may also be thiourea derivatives, such as N,N'-diethylthiourea, dibutylthiourea, dilaurylthiourea, and the like for example.

Examples of the metal powder include one or two or more of cobalt powder, iron powder, zinc powder, tin powder, and copper powder. The metal powder is preferably used in combination with the organic sulfur-containing compound and/or the amine-type antioxidant compared with single use.

The thermal stabilizer is preferably an aromatic ring-containing compound in terms of required stability at high temperature higher than or equal to near the melting point of the TFE-based copolymer contained in the powder coating material composition of the present disclosure, for example, higher than or equal to approximately 250° C. The thermal stabilizer is more preferably the aromatic amine, the mercaptobenzothiazole-type compound, and the mercaptobenzimidazole-type compound.

The thermal stabilizer is preferably a non-metal compound leaving no metal residue when the powder coating material composition of the present disclosure is used for chemical and medical instruments, semiconductor manufacturing equipment, and the like.

The thermal stabilizer can be manufactured by a conventionally known method. A commercial product can also be typically used.

A content of the thermal stabilizer is preferably 0.001 to 5 parts by mass relative to 100 parts by mass of the TFE-based copolymer. If the content is less than 0.001 part by mass, the TFE-based copolymer may have deteriorated thermal stability. If the content exceeds 5 parts by mass, the obtained film causes coloring or foaming due to decomposition of the thermal stabilizer, which is unpreferable. The content is more preferably 0.003 to 2 parts by mass.

The powder coating material composition of the present disclosure may contain a coloring pigment. Examples of the coloring pigment include titanium oxide, cobalt oxide, carbon, chromium oxide, iron oxide, and mica.

A content of the coloring pigment is preferably 0.001 to 5 parts by mass relative to 100 parts by mass of the TFE-based copolymer. If the content is less than 0.001 part by mass, the target coloring may not be obtained. If the content exceeds 5 parts by mass, the obtained film may cause foaming. The content is more preferably 0.003 to 2 parts by mass.

The powder coating material composition of the present disclosure may contain an additive and the like as necessary in combination with the TFE-based copolymer and the stabilizer and/or the coloring pigment, which are used if desired. The additive and the like are not limited, and examples thereof include additives used for common powder coating material compositions.

Examples of the additive and the like include: other pigments such as an anti-rusting pigment and a fired pigment for purposes of anti-rusting and the like; coating-film-reinforcing materials, such as carbon fiber, glass fiber, glass flake, and mica for a purpose of inhibiting contraction of the coating film; and conductivity-imparting materials, such as conductive carbon for a purpose of imparting conductivity. The additive and the like may also be a leveling agent, an antistatic agent, and the like.

A content of the additive is preferably 0 to 10.0 mass %, and more preferably 0 to 5.0 mass % relative to the powder coating material composition.

Average particle sizes of the thermal stabilizer, coloring pigment, and additive are preferably 0.1 to 70 and more preferably 0.1 to 50 These materials having particle sizes within the above ranges can be uniformly dispersed in the composition to be stably subjected to coating.

These average particle sizes are values measured by a laser diffraction method. In specific, these average particle sizes are median diameters on a volumetric basis measured with MT-3300II, manufactured by MicrotracBEL Corp.

A method for manufacturing the powder coating material composition of the present disclosure is not limited, and examples thereof include conventionally known methods such as a crushing method, a granulating method, and a spray-drying method. Examples thereof also include a method, as disclosed in Japanese Patent Laid-Open No. 63-270740, including: compressing the aforementioned TFE-based copolymer into a sheet with a roller; crushing and classifying the sheet with a crushing machine to obtain a powder; and dry-mixing the powder, the aforementioned stabilizer and coloring pigment, and additives and the like such as the conductivity-imparting material used as necessary.

The method for manufacturing the powder coating material may be a method including: mixing the TFE-based copolymer, the stabilizer, and the additive and the like used as necessary with a mixer in advance; subsequently melt-kneading the mixture with a kneader, a melt-extruder, or the like; and then crushing and, as necessary, classifying the melt-kneaded product.

The powder coating material composition of the present disclosure obtained as above is typically used by coating on the object to be coated, and then forming a film with heating and baking.

The object to be coated is not limited, and the powder coating material composition of the present disclosure can be suitably used for articles to which imparting corrosion resistance is desired. Examples of such objects to be coated include materials to be subjected to the corrosion-resistant lining, such as a tank, a vessel, a tower, a valve, a pump, a joint, another piping material, a part, and a sealing material.

The powder coating material composition of the present disclosure is particularly preferably used for a metal substrate. Specific examples of the metal substrate include industrial-parts-related use such as piping, a pipe, and a duct. An inner face thereof is coated with the powder coating material composition.

Use of the powder coating material composition of the present disclosure for the metal substrate is advantageous in terms of prevention of corrosion of the substrate.

Examples of the metal include: metal single substances such as iron, aluminum, and copper; and alloys thereof. Examples of the alloys include stainless steel (SUS). The substrate may contain other materials in addition to the metal.

In particular, the substrate is more preferably composed of iron, aluminum, or stainless steel.

The object to be coated may be subjected to surface treatments such as washing and sand-blasting, and primer coating, as necessary.

Examples of the primer include a primer containing a fluororesin, which is commonly used.

A thickness of the primer film is preferably 20 to 150 µm, and more preferably 30 to 100 µm.

The primer film is coated with the powder coating material composition of the present disclosure, and subjected to heating and baking to be able to form the film.

A coating method with the powder coating material of the present disclosure is not limited, and exampled thereof include conventionally known methods such as an electrostatic coating method, a loto-lining method, and a fluidized dip coating method. Since the powder coating material composition of the present disclosure can yield the film having excellent surface smoothness regardless of a number of coating times, the electrostatic coating method is preferably used.

Although depending on the use, the powder coating material composition of the present disclosure may be subjected to coating separately a plurality of times so as to yield a target film thickness. The powder coating material composition of the present disclosure can yield good smoothness on the coated surface regardless of the number of coating times. The number of coating times is not limited, and one to ten according to the purpose.

Examples of a film thickness of the repeat-coating as necessary and after the baking include 20 to 5,000 µm. When the purpose is to impart corrosion resistance such as the corrosion-resistant lining, the film thickness is preferably 300 to 5000 µm. When the electrostatic coating method is used, the film thickness is typically 50 to 1000 µm.

Examples of a temperature for the heating and baking include 250 to 350° C.

The film formed from the powder coating material composition of the present disclosure as noted above is also one of the present disclosure.

In addition, the film formed form the powder coating material composition of the present disclosure by the electrostatic coating method as noted above is also one of the present disclosure.

Furthermore, a laminate having the above film is also one of the present disclosure. A laminate having the above film in a surface layer is also one of the present disclosure.

Examples of the laminate of the present disclosure include, as noted above: the laminate in which the powder coating material composition of the present disclosure is subjected to coating a plurality of times to stack the films; and the laminate in which the film formed from the powder coating material of the present disclosure is provided on the primer film. In such laminates, the film composed of the powder coating material composition of the present disclosure is preferably the outermost layer.

As noted above, the coated article in which the film of the present disclosure is provided on the metal substrate is one of the present disclosure.

In addition, the coated article in which the metal substrate is piping, a pipe, or a duct, and the film of the present disclosure is provided on an inner face thereof is one of the present disclosure.

The film of the present disclosure may be directly provided on the metal substrate, or may be provided via the primer film.

As noted above, a film-forming method, comprising:
(1) forming a primer film on an object to be coated; and
(2) forming a film on a surface of the primer film by using the powder coating material composition according to any one of claims 1 to 4 by an electrostatic coating method is one of the present disclosure.

Since having the aforementioned specific copolymerization formulation, MFR, and melting point, the powder coating material composition of the present disclosure has excellent processability that can yield the film having surface smoothness regardless of the number of coating times. The powder coating material composition of the present disclosure can also yield the film having excellent chemical resistance and not causing cracking due to chemicals and temperature impact. Such advantageous effects are sufficiently exhibited even with the thick coating, and such advantageous effects are particularly excellent even when the purpose is imparting corrosion resistance.

EXAMPLES

Hereinafter, the present disclosure will be specifically described based on Examples.

In the following Examples, "parts" and "%" respectively refer to "parts by mass" and "mass %" unless otherwise specified.

Example 1

A TFE-based copolymer powder A (HFP: 11.1%, PPVE: 1.0%, a melt flow rate at 372° C.: 17.0 g/10-min, melting point: 258° C.) was compressed into a sheet with a roller compacter, disintegrated into a size of several millimeters, and then crashed with a hammer mill to obtain a powder coating material composition A having an average particle size of 50 to 60 µm and an apparent density of 0.80 to 0.90 g/ml.

A degreased iron substrate (100 mm×200 mm×5 mm) was subjected to blasting with Tosa Emery (manufactured by Ujiden Chemical Industry Co., Ltd.) as alumina with 80 mesh at a pressure of 0.5 MPa, and the blast powder was removed with air. Then, TC-11000 (manufactured by DAIKIN INDUSTRIES, LTD.) was subjected to coating as a primer, and dried to obtain a 30 to 50 µm film.

This primer film was coated with the powder coating material composition A by an electrostatic coating method, and then subjected to baking by vertically hanging in a drying furnace at 285° C. for 30 minutes to obtain a film having a thickness of approximately 150 µm.

Furthermore, this film was repeatedly subjected to coating with the powder coating material composition A and baked for four times to obtain a film having a total thickness of approximately 500 μm.

Example 2

A film having a thickness of approximately 150 μm and a film having a total thickness of approximately 500 μm were obtained in the same manner as in Example 1 except that a powder coating material composition B was obtained by using a TFE copolymer powder B (HFP: 11.7 (mass %), PPVE: 1.0 (mass %), a melt flow rate at 372° C.: 25.0 g/10-min, a melting point: 255° C.) instead of the TFE copolymer powder A.

Example 3

A film having a thickness of approximately 150 μm and a film having a total thickness of approximately 500 μm were obtained in the same manner as in Example 1 except that a powder coating material composition C was obtained by using a TFE copolymer powder C (HFP: 11.4 (mass %), PPVE: 0.8 (mass %), a melt flow rate at 372° C.: 21.8 g/10-min, a melting point: 257° C.) instead of the TFE copolymer powder A.

Example 4

A film having a thickness of approximately 150 μm and a film having a total thickness of approximately 500 μm were obtained in the same manner as in Example 1 except that a powder coating material composition D was obtained by using a TFE copolymer powder D (HFP: 9.8 (mass %), PPVE: 2.6 (mass %), a melt flow rate at 372° C.: 20.5 g/10-min, a melting point: 265° C.) instead of the TFE copolymer powder A.

Example 5

A film having a thickness of approximately 150 μm and a film having a total thickness of approximately 500 μm were obtained in the same manner as in Example 1 except that a powder coating material composition E was obtained by using a TFE copolymer powder E (HFP: 12.5 (mass %), PPVE: 1.0 (mass %), a melt flow rate at 372° C.: 25.6 g/10-min, a melting point: 250° C.) instead of the TFE copolymer powder A.

Comparative Example 1

A film having a thickness of approximately 150 μm and a film having a total thickness of approximately 500 μm were obtained in the same manner as in Example 1 except that a powder coating material composition F was obtained by using a TFE copolymer powder F (HFP: 11.5 (mass %), PPVE: 0.9 (mass %), a melt flow rate at 372° C.: 35.0 g/10-min, a melting point: 257° C.) instead of the TFE copolymer powder A.

Comparative Example 2

A film having a thickness of approximately 150 μm and a film having a total thickness of approximately 500 μm were obtained in the same manner as in Example 1 except that a powder coating material composition G was obtained by using a TFE copolymer powder G (HFP: 11.0 (mass %), PPVE: 1.0 (mass %), a melt flow rate at 372° C.: 7.0 g/10-min, a melting point: 258° C.) instead of the TFE copolymer powder A.

Comparative Example 3

A film having a thickness of approximately 150 μm and a film having a total thickness of approximately 500 μm were obtained in the same manner as in Example 1 except that a powder coating material composition H was obtained by using a TFE copolymer powder H (HFP: 6.8 (mass %), PPVE: 1.3 (mass %), a melt flow rate at 372° C.: 18.3 g/10-min, a melting point: 280° C.) instead of the TFE copolymer powder A.

Comparative Example 4

A film having a thickness of approximately 150 μm and a film having a total thickness of approximately 500 μm were obtained in the same manner as in Example 1 except that a powder coating material composition I was obtained by using a TFE copolymer powder I (HFP: 15.0 (mass %), PPVE: 0.1 (mass %), a melt flow rate at 372° C.: 20.0 g/10-min, a melting point: 230° C.) instead of the TFE copolymer powder A.

Surface roughness of the obtained film was calculated by the following method to evaluate a state of the film.

Table 1 also shows the results.

(Surface Roughness Ra)

The surface roughness Ra (arithmetically averaged roughness) was calculated by using a surface roughness shape measurement apparatus (SJ-210, manufactured by Mitutoyo Corporation) in accordance with JIS B 0601-1994, and averaging measured values at five measurement points.

TABLE 1

| | Copolymerization formulation (mass %) | | MFR (g/10- min) | Melting point (° C.) | Surface roughness Ra (μm) | | State of film |
| | HFP | PPVE | | | One layer | Five layers | |
| --- | --- | --- | --- | --- | --- | --- | --- |
| Example 1 | 11.1 | 1.0 | 17.0 | 258 | 0.55 | 0.22 | Good smoothness |
| Example 2 | 11.7 | 1.0 | 25.0 | 255 | 0.41 | 0.19 | Good smoothness |
| Example 3 | 11.4 | 0.8 | 21.8 | 257 | 0.50 | 0.24 | Good smoothness |

TABLE 1-continued

| | Copolymerization formulation (mass %) | | MFR (g/10- | Melting point | Surface roughness Ra (μm) | | |
|---|---|---|---|---|---|---|---|
| | | | | | One layer | Five layers | State of film |
| | HFP | PPVE | min) | (° C.) | | | |
| Example 4 | 9.8 | 2.6 | 20.5 | 265 | 0.57 | 0.28 | Good smoothness |
| Example 5 | 12.5 | 1.0 | 25.6 | 250 | 0.46 | 0.18 | Good smoothness |
| Comparative Example 1 | 11.5 | 0.9 | 35.0 | 257 | 0.34 | (Foamed, dripped) | Foamed, dripped |
| Comparative Example 2 | 11.0 | 1.0 | 7.0 | 258 | 1.06 | 0.59 | Insufficient smoothness |
| Comparative Example 3 | 6.8 | 1.3 | 18.3 | 280 | 7.78 | 6.95 | Insufficient melting |
| Comparative Example 4 | 15.0 | 0.1 | 20.0 | 230 | 0.59 | (Foamed, dripped) | Foamed, dripped |

INDUSTRIAL APPLICABILITY

Since having the aforementioned constitution, the powder coating material composition of the present disclosure yields good surface smoothness of the film, and in particular, is suitable as the powder coating material composition for metal substrates.

The invention claimed is:

1. A powder coating material composition, comprising a tetrafluoroethylene-based copolymer, wherein the tetrafluoroethylene-based copolymer is a copolymer of 9.0 to 13.0 mass % of hexafluoropropylene, 0.8 to 3.0 mass % of a perfluoropropyl vinyl ether, and tetrafluoroethylene, having a melt flow rate of 13 to 26 g/10-min, a melting point of 240 to 270° C., an average particle size of 5 to 500 μm and an apparent density of 0.5 to 1.1 g/ml.

2. The powder coating material composition according to claim 1, further comprising a thermal stabilizer and/or a coloring pigment.

3. The powder coating material composition according to claim 2, wherein the thermal stabilizer is at least any one selected from the group consisting of an amine-type anti-oxidant, an organic sulfur-containing compound, and a metal powder.

4. A film formed from the powder coating material composition according to claim 1.

5. A film formed form the powder coating material composition according to claim 1 by an electrostatic coating method.

6. A laminate, comprising the film according to claim 4.

7. A laminate, comprising the film according to claim 4 in a surface layer.

8. A coated article, wherein the film according to claim 4 is provided on a metal substrate.

9. A coated article, wherein a metal substrate is piping, a pipe, or a duct, and the film according to claim 4 is provided on an inner surface thereof.

10. A film-forming method, comprising:
(1) forming a primer film on an object to be coated; and
(2) forming a film on a surface of the primer film by using the powder coating material composition according to claim 1 by an electrostatic coating method.

\* \* \* \* \*